(12) United States Patent
Goennheimer et al.

(10) Patent No.: US 12,147,383 B2
(45) Date of Patent: Nov. 19, 2024

(54) DYNAMIC LOADING OF FILES USING ASYNCHRONOUS FORMAT

(71) Applicant: SAP SE, Walldorf (DE)

(72) Inventors: Joachim Goennheimer, Walldorf (DE); Sven Sterbling, Boblingen (DE)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 18/077,757

(22) Filed: Dec. 8, 2022

(65) Prior Publication Data
US 2024/0193122 A1 Jun. 13, 2024

(51) Int. Cl.
*G06F 16/11* (2019.01)
*G06F 16/18* (2019.01)

(52) U.S. Cl.
CPC ........ *G06F 16/116* (2019.01); *G06F 16/1873* (2019.01)

(58) Field of Classification Search
None
See application file for complete search history.

(56) References Cited

U.S. PATENT DOCUMENTS

| | | | | |
|---|---|---|---|---|
| 6,760,840 B1 * | 7/2004 | Shimbo | ................. | G06F 40/166 715/205 |
| 7,680,830 B1 * | 3/2010 | Ohr | ....................... | G06F 16/125 707/999.2 |
| 2008/0313191 A1 * | 12/2008 | Bouazizi | ............. | H04L 12/1863 |
| 2012/0089569 A1 * | 4/2012 | Mason, Jr. | .......... | G06F 16/1873 707/639 |
| 2014/0122545 A1 * | 5/2014 | Cain | ....................... | G06F 16/11 707/825 |
| 2015/0106478 A1 * | 4/2015 | Zeitlin | .................... | H04L 67/06 709/219 |
| 2015/0213044 A1 * | 7/2015 | Sparenberg | ........... | G06F 16/164 707/823 |

* cited by examiner

*Primary Examiner* — Augustine K. Obisesan
(74) *Attorney, Agent, or Firm* — SCHWEGMAN LUNDBERG & WOESSNER, P.A.

(57) ABSTRACT

A computer system may send an async version of a file to a client, with the async version of the file comprising a uniform resource identifier for the file, a secret key for accessing the file, one or more filter parameters, and at least one of metadata of the file or a sample of data of the file. A portion of the data of the file may be excluded from the async version. The computer system may receive a request for additional data of the file from the client, with the request comprising a parameter value for the filter parameter(s), and then generate a requested version of the file based on the request, including at least a portion of the data of the file in the requested version based on the parameter value. The computer system may then send the requested version of the file to the client component.

20 Claims, 6 Drawing Sheets

300 —

THE FOLLOWING FILE DATA IS AVAILABLE FOR CONSUMPTION UNTIL THE SPECIFIED EXPIRATION DATE

RESOURCE URI: HTTPS://DATASOURCE-A.LARGE-FILE.CSV.ASYNC —302
EXPIRATION DATE: DECEMBER 31, 2022 —304
DESCRIPTION: EUROPEAN SALES RECORDS —306
CREATOR: SVEN STERBLING —308
SAMPLE OF FILE DATA: CLICK HERE —310
TOTAL SIZE: 7.0 MB —312
REMAINING SIZE: 6.9 MB —314

LOAD ALL FILE DATA

[ LOAD ALL ] —316

LOAD MORE FILE DATA USING FILTER PARAMETER(S)

318 — FILTER BY COUNTRY: [ *ENTER COUNTRY CODE* ] —319

[ LOAD MORE ] —320

*FIG. 3*

DYNAMIC LOADING OF FILES USING ASYNCHRONOUS FORMAT

BACKGROUND

Many modern cloud applications rely on a high velocity of data and a high volume of data that originate from different and dispersed data sources. As a result, the files in which the data are transmitted and processed are often very large.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 3 illustrates an example user interface in which contents of an async version of a file are displayed.

DETAILED DESCRIPTION

Figure 1:
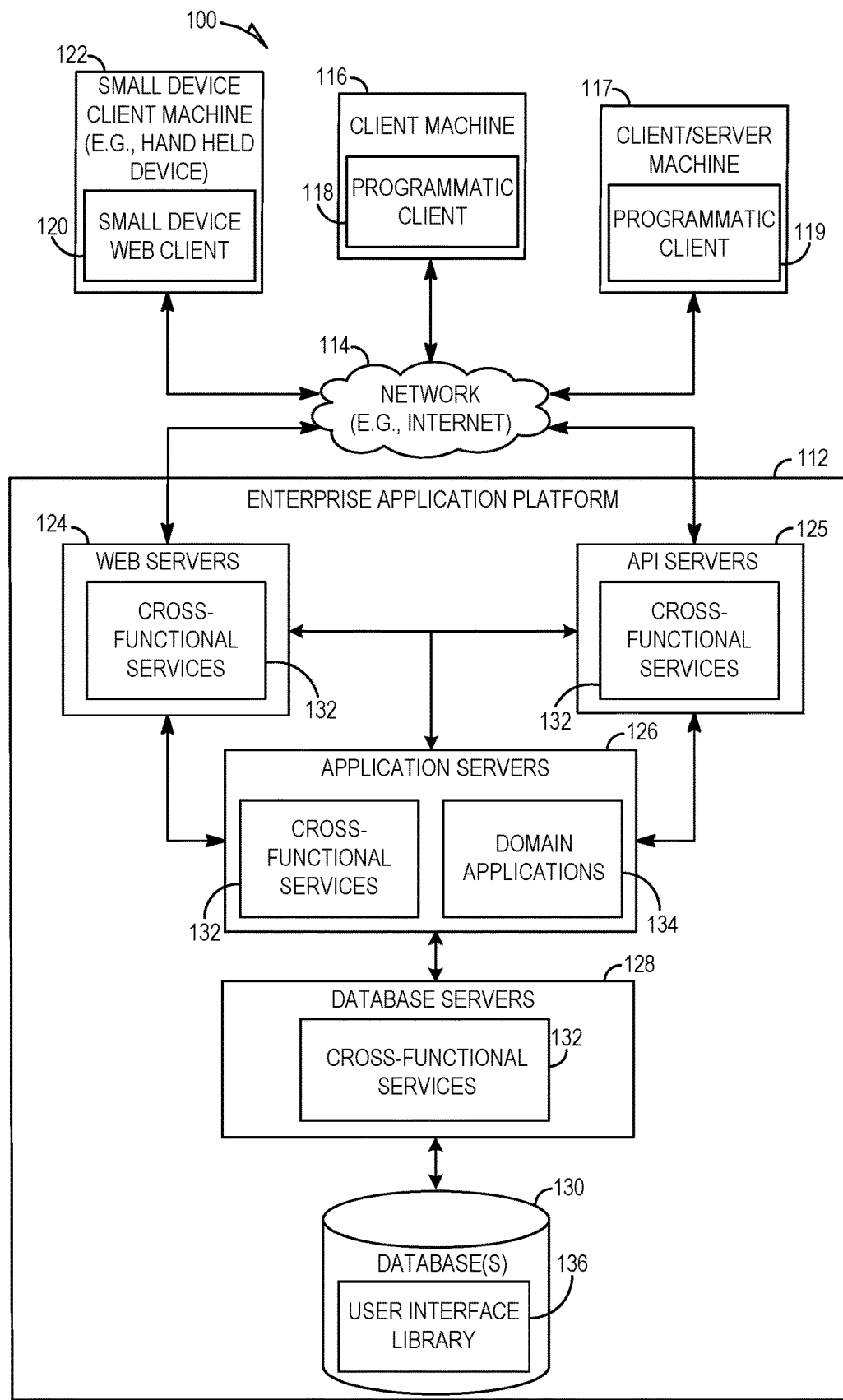
FIG. 1 is an example network diagram illustrating a system.

Example methods and systems of dynamically loading files using an asynchronous file format are disclosed. In the following description, for purposes of explanation, numerous specific details are set forth in order to provide a thorough understanding of example embodiments. It will be evident, however, to one skilled in the art that the present embodiments can be practiced without these specific details.

When data files are large, the transmission and processing of such files consumes a significant amount of electronic resources, such as network bandwidth, electrical power, central processing units, and memory. Many software applications do not actually need all the data at exactly the time that the file is received. Sometimes, a software application may only need a portion of the data, or the software application may need the data, but not necessarily at the exact point in time at which it is received. In one example, an analytics batch job may analyze sales records for a specific region. The data source may only provide comma-separated values (CSV) files for sales records, where some of the sales records have a column with a region, but others do not. The batch job may still need to retrieve all of the files and check whether the region column is there. These files may be very large and retrieving them may use up a lot of resources. Furthermore, depending on certain characteristics of the data, such as the region, location, and the data source from which data is requested, parts of the data might have to be omitted due to data protection regulations or other compliance regulations (e.g., data about European customers might not be allowed to be transferred to applications running in the United States). Making sure that files only contain compliant data manually currently requires a lot of human coordination effort between the data source and the system consuming the data, also referred to as the data consuming system. Delegating these compliance checks to the data source level is infeasible because the data consuming systems have different requirements that cannot all be met simultaneously and in advance of the data being transmitted from the data sources to the data consuming systems. Other technical challenges may arise as well.

The implementation of the features disclosed herein involves a non-generic, unconventional, and non-routine operation or combination of operations. By applying one or more of the solutions disclosed herein, some technical effects of the system and method of the present disclosure are to dynamically load a file using an asynchronous file format. In some example embodiments, a computer system may send an async version of a file that is stored in a data source and comprises data to a client component. The async version of the file may comprise a uniform resource identifier for the file, a secret key for accessing the file, one or more filter parameters, and at least one of metadata of the file or a sample of the data of the file. At least a portion of the data of the file may be excluded from the async version of the file. Subsequently, the computer system may receive a request for additional data of the file from the client component, with the request for additional data from the file comprising a parameter value for at least one of the one or more filter parameters. Next, the computer system may generate a requested version of the file based on the request for additional data of the file, with the generating of the requested version of the file comprising including at least a portion of the data of the file in the requested version of the file based on the parameter value for the at least one of the one or more filter parameters, and then send the requested version of the file to the client component.

By first sending an async version of a file that excludes a portion of the data of the file, and then generating and sending a requested version of the file based on a request for additional data of the file, the computer system effectively reduces the size of the data that is being transmitted and processed, thereby reducing the consumption of system resources. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
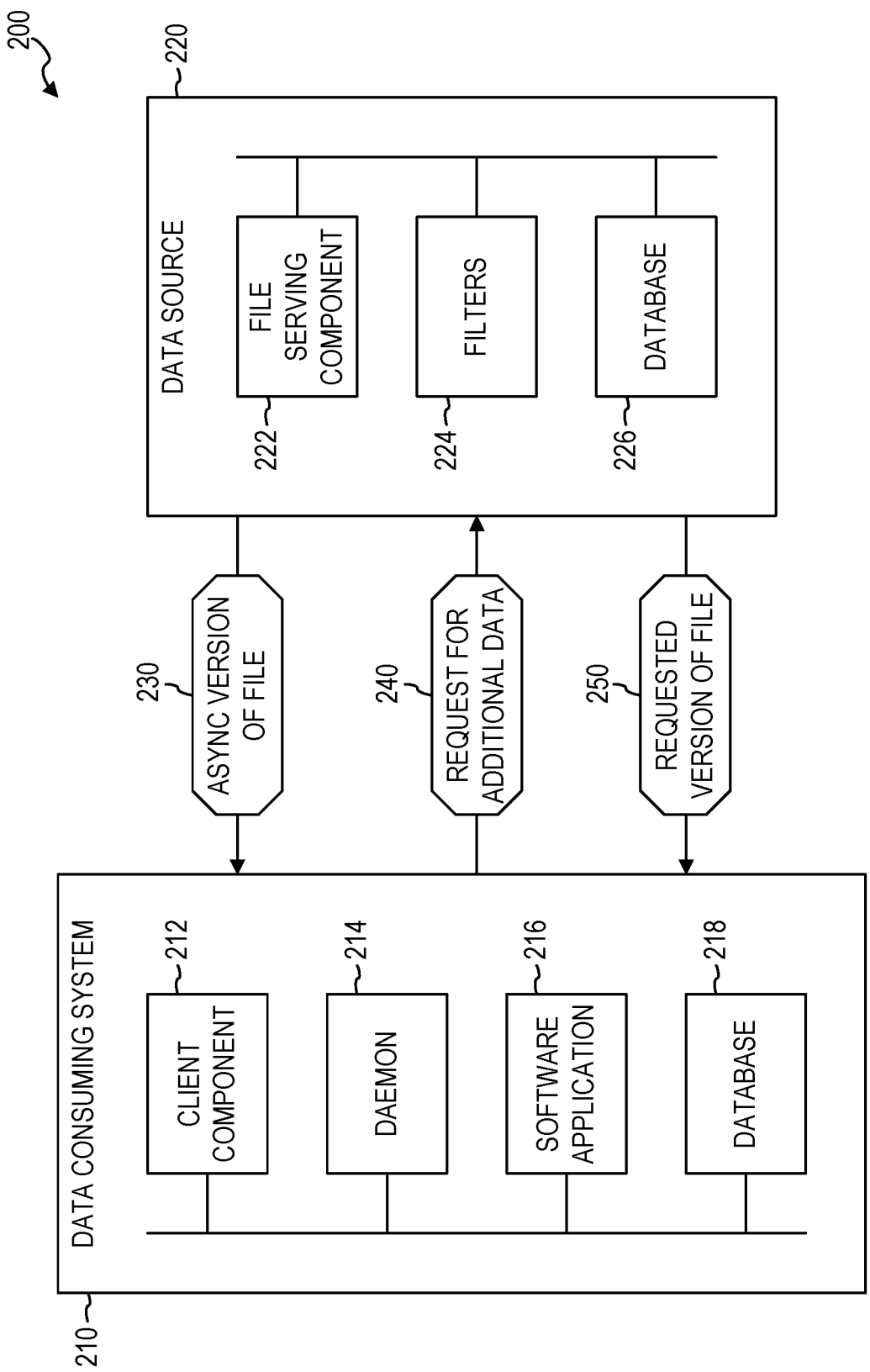
FIG. 2 is a block diagram illustrating an example dynamic loading system.

FIG. 2 is a block diagram illustrating an example dynamic loading system 200. The components shown in FIG. 2 may be configured to communicate with each other via one or more network connections, such as via the network 114 in FIG. 1. In some example embodiments, the dynamic loading system 200 comprises a data consuming system 210 and a data source 220. The data consuming system 210 may comprise any combination of one or more of a client component 212, a daemon 214, a software application 216, and a database 218. The data source 220 may comprise any combination of one or more of a file serving component 222, one or more filters 224, and a database 226.

One or more of the components of the data consuming system 210 may be implemented by the enterprise application platform 112 of FIG. 1. For example, the client component 212, the daemon 214, and the software application 216 may be incorporated into the application server(s) 126, while the database 218 may be incorporated into the database(s) 130. However, the data consuming system 210 may be implemented in other ways as well. Similarly, one or more components of the data source 220 may be implemented by the enterprise application platform 112 of FIG. 1. For example, the file serving component 222 and the filters 224 may be incorporated into the application server(s) 126, while the database 226 may be incorporated into the database(s) 130. However, the data source 220 may be implemented in other ways as well.

In some example embodiments, the file serving component 222 may be configured to send an async version 230 of a file to the client component 212. The file may be stored in the database 226 of the data source 220 and comprise data. The async version 230 of the file may be created and sent to the client component 212 in response to a change in the state of the file in the data source 220, such as the file having been created or updated. In some other example embodiments, the async version 230 of the file may be created and sent to the client component 212 as part of a periodic process in which async versions 230 of files are created and sent by the data source 220 at regular intervals (e.g., every 24 hours).

At least a portion of the data of the file may be excluded from the async version 230 of the file. Instead of sending the entire file, the file serving component 222 may send the async version 230 of the file in order to reduce the amount of data being transmitted to the client component 212, thereby reducing the burden on electronic resources of the underlying computer system. The async version 230 of the file may be configured to serve as a portable API for the file. The async version 230 of the file may comprise a file format that limits the content of the async version 230 of the file to only the essential information for an initial interaction the file servicing component 222 and the client component 212, providing the client component 212 with an indication of the content of the file, information for obtaining additional content of the file, and information for controlling what additional content of the file is to be obtained.

In some example embodiments, the async version 230 of the file may comprise a uniform resource identifier for the file, a secret key for accessing the file, one or more filter parameters, and at least one of metadata of the file or a sample of the data of the file. However, the async version 230 of the file may comprise other types and combinations of data. The uniform resource identifier for the file provides information to the client component 212 as to where the client component 212 can retrieve additional data from the file. The secret key for accessing the file may comprise any password, license, key, token, or other security code, information, method, technology, or device used, alone or in combination, to verify an entity's identity and authorization to access the file.

The one or more filter parameters may comprise one or more dimensions of the data of the file. A dimension is a structure that categorizes facts and measures. Examples of dimensions include, but are not limited to, people, products, client identifications, geographic locations or regions, and time. In one example, the one or more filter parameters may comprise the category of country or country code, thereby indicating to the client component 212 or a user of the client component 212 that additional data from the file may be filtered based on one or more indicated countries or country codes. The file serving component 222 may use one or more filters 224 that implement rules on how to send files to the client component 212. These filters 224 can be tuned by one or more parameters that are set by the client component 212. The one or more parameters may additionally or alternatively be set by the file serving component 222 itself based on an Internet Protocol (IP) address range, region, location, application, client identification of a client that is requesting the data of the file. In this way, data protection regulations and other compliance restrictions can be enforced and audited at the data source level and clients do not have to worry about retrieving customer data from other regions.

The metadata of the file may comprise at least one of a characterization of the data of the file, an identification of a creator of the file, a total size of the file, or a size of the at least a portion of the data of the file excluded from the async version 230 of the file. The characterization of the data of the file may comprise a summarization of the general characteristics or features of the data of the file. The identification of the creator of the file may comprise the name of the author of the file. The size of the at least a portion of the data of the file excluded from the async version 230 of the file may indicate the size of the data from the file that is still remaining to be sent from the data source 220 to the data consuming system 210. The sample of the data of the file may comprise a representative subset of the data that can be used as a preview of the file. For example, the sample of the data of the file may comprise the first ten rows of the file in a comma-separated values (CSV) format. The async version 230 of the file may further comprise an expiration date for accessing the file at the uniform resource identifier. The expiration date may indicate the last date on which data from the file may be retrieved at the uniform resource identifier included in the async version 230 of the file.

In some example embodiments, the client component 212 may be configured to receive the async version 230 of the file from the file serving component 222 and to display contents of the async version 230 of the file on a computing device of a user. For example, the client component 212 may display the one or more filter parameters and the at least one of the metadata of the file or the sample of the data of the file on the computing device. The client component 212 may be configured to receive a parameter value for at least one of the one or more filter parameters from the computing device. For example, a user may submit the parameter value for the at least one of the one or more filter parameters via a user interface displayed on the computing device.

The client component 212 may be configured to generate a request 240 for additional data of the file using the parameter value for the at least one of the one or more filter parameters. For example, the client component 212 may create a message that comprises the parameter value for the at least one of the one or more filter parameters. The message may also comprise an indication that the parameter value for the at least one of the one or more filter parameters is to be used in filtering data to be sent back to the client component 212. The client component 212 may be configured to send the request 240 for additional data of the file to the file serving component 222.

FIG. 3 illustrates an example user interface 300 in which contents of the async version 230 of a file are displayed. In FIG. 3, user interface 300 displays a uniform resource identifier 302 for accessing the file, an expiration date 304 indicating the last date on which data from the file may be retrieved at the uniform resource identifier 302, a characterization 306 of the data of the file, an indication of the creator 308 of the file, a link 310 to a sample of the data of the file, a total size 312 of the file, and a remaining size 314 of the portion of the data of the file excluded from the async version 230 of the file. The user interface 300 may also display selectable user interface elements 316 and 320 that are configured to trigger the generation and sending of the request 240 for additional data of the file. The request 240 that is generated and sent in response to the selection of the selectable user interface element 316 may comprise a request for all of the data of the file, whereas the request 240 that is generated and sent in response to the selection of the selectable user interface element 316 may comprise a request for a filtered portion of the data of the file. The user interface 300 may display a corresponding indication 318 for each one of the one or more filter parameters along with a corresponding user interface element 319 (e.g., a text field) that is configured to receive user input specifying a corresponding parameter value for the filter parameter.

In some example embodiments, the file serving component 222 may be configured to receive the request 240 for additional data of the file from the client component 212. The request 240 for additional data from the file may comprise the parameter value for at least one of the one or more filter parameters. However, other configurations for the request 240 for additional data of the file are also within the scope of the present disclosure. The file serving component 222 may be configured to generate a requested version 250 of the file based on the request 240 for additional data of the file. The generating of the requested version 250 of the file may comprise including at least a portion of the data of the file in the requested version 250 of the file based on the parameter value for the at least one of the one or more filter parameters. The including of the at least a portion of the data of the file in the requested version 250 of the file may comprise filtering the data of the file based on the parameter value for at least one of the one or more dimensions of the data of the file. For example, the file serving component 222 may limit the data from the file that is included in the requested version 250 of the file to only sales records of customers that are location in a set of geographical regions indicated by the parameter values included in the request 240 for additional data. The file serving component 222 may be configured to send the requested version 250 of the file to the client component 212, and the client component 212 may be configured to receive the requested version 250 of the file. The requested version 250 of the file may comprise data that corresponds to and satisfies the parameter value for the at least one of the one or more filter parameters. For example, the requested version 250 of the file may comprise data that has passed a filtering process that used the parameter value for the at least one of the one or more filter parameters as a basis for including the data in the requested version 250 of the file.

The client component 212 may be configured to, in response to receiving the requested version 250 of the file, store the at least a portion of the data of the file included in the requested version 250 of the file in the database 218. The database 218 may be configured to store data for the software application 216 or for some other resource of the data consuming system 210. The client component 212 may also be configured to provide the portion of the data of the file included in the requested version 250 of the file to the software application 216. The software application 216 may comprise a cloud-based analytics application. However, other types of software applications 216 are also within the scope of the present disclosure.

The daemon 214 may be configured to manage a lifecycle of the portion of the data of the file stored in the database 218. For example, the daemon 214 may be configured to delete data stored in the database 218 after a specified period of time has passed, remove duplicate data stored in the database 218, or apply other lifecycle rules as well. The lifecycle rules may be defined by a user of the data consuming system 210, such as a user of the database 218 or a user of the software application 216.

The daemon 214 may manage all async versions 230 and requested versions 250 of files on a computing instance. For this purpose, the daemon 214 may maintain a set of metadata for the async versions 230 and the requested versions 250, such as a list of the async versions 230 and the requested versions 250 that have been received by the client component 212, the corresponding download time for each one of the async versions 230 and the requested versions 250, a time to live for each one of the async versions 230 and the requested versions 250, and other parameters. Based on the metadata, the daemon 214 may optimize for storage consumption by altering, compressing, or deleting the downloaded async versions 230 and the downloaded requested versions 250 based on the fetched metadata. For example, if no active software application 216 accesses the data from the requested version 250 of the file, then the daemon 214 may deletes that data from the database 218. The daemon 214 may also be used to regularly fetch updates to a particular file from the file serving component 222. The daemon 214 may be responsible for watching all available async versions 230 and managing their respective lifecycle. Rules for it can be defined on a general level, but also specifically for certain file types or files. Based on the rules, the daemon 214 may update files, count references, delete files when their end of lifetime is reached, or set them back to a more asynchronous state by deleting parts of the data contained.

The client component 212 may be implemented as a transparent application opener or as a command-line interface (CLI). The client component 212 may read async versions 230 of files and learn how to fetch the corresponding filtered data from the file serving component 222. The client component 212 may also contain a mapping between the file and the software application 216 (e.g., retrieved from an operating system of the data consuming system 210) that is used to open the file type. The client component 212 may also be integrated as a plug-in into different software applications 216 that allow viewing files (e.g., spreadsheet applications, word processing applications), which may allow for a more seamless experience when asynchronously loading partial data from the file. The client component 212 may include a CLI that can be used in UNIX® fashion to use async versions 230 of files in scripts and data pipelines. When using the CLI, configuration parameters may be passed as arguments.

Figure 4:
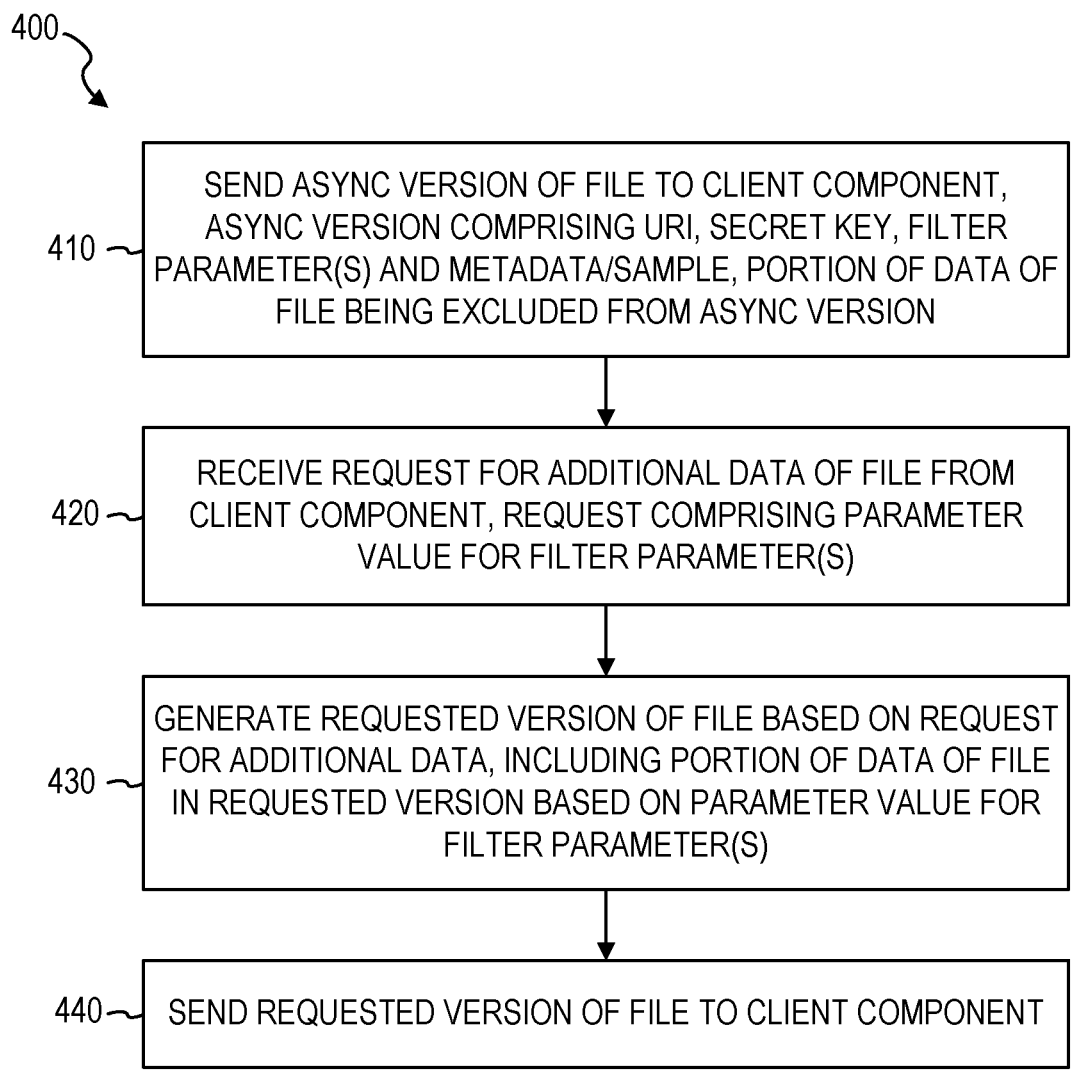
FIG. 4 is a flowchart illustrating an example method of dynamically loading a file.

FIG. 4 is a flowchart illustrating an example method of dynamically loading a file. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the data source 220 of FIG. 2 or any combination of one or more of its components (e.g., the file serving component 222).

At operation 410, the data source 220 may send an async version 230 of a file to a client component 212. The file may be stored in a data source 220 and comprise data. In some example embodiments, the async version 230 of the file may be created and sent to the client component 212 in response to a change in the state of the file in the data source 220, such as the file having been created or updated. In some other example embodiments, the async version 230 of the file may be created and sent to the client component 212 as part of a periodic process in which async versions 230 of files are created and sent by the data source 220 at regular intervals (e.g., every 24 hours).

The async version 230 of the file may comprise a uniform resource identifier for the file, a secret key for accessing the file, one or more filter parameters, and at least one of metadata of the file or a sample of the data of the file. However, the async version 230 of the file may comprise other types and combinations of data. The one or more filter parameters may comprise one or more dimensions of the data of the file. The metadata of the file may comprise at least one of a characterization of the data of the file, an identification of a creator of the file, a total size of the file, or a size of the at least a portion of the data of the file excluded from the async version 230 of the file. The async version 230 of the file may further comprise an expiration date for accessing the file at the uniform resource identifier. At least a portion of the data of the file may be excluded from the async version 230 of the file.

Next, the data source 220 may receive a request 240 for additional data of the file from the client component 212, at operation 420. The request 240 for additional data from the file may comprise a parameter value for at least one of the one or more filter parameters. However, other configurations for the request 240 for additional data of the file are also within the scope of the present disclosure.

The data source 220 may then, at operation 430, generate a requested version 250 of the file based on the request 240 for additional data of the file. The generating of the requested version 250 of the file may comprise including at least a portion of the data of the file in the requested version 250 of the file based on the parameter value for the at least one of the one or more filter parameters. The including of the at least a portion of the data of the file in the requested version 250 of the file may comprise filtering the data of the file based on the parameter value for at least one of the one or more dimensions of the data of the file.

At operation 440, the data source 220 may send the requested version 250 of the file to the client component 212. For example, the requested version 250 of the file may be transmitted from the data source 220 to the client component 212 via a network connection, such as the network 114 of FIG. 1. The data source 220 may send the requested version 250 of the file to the client component 212 in response to the requested version 250 having been generated at operation 430.

It is contemplated that any of the other features described within the present disclosure can be incorporated into the method 400.

Figure 5:
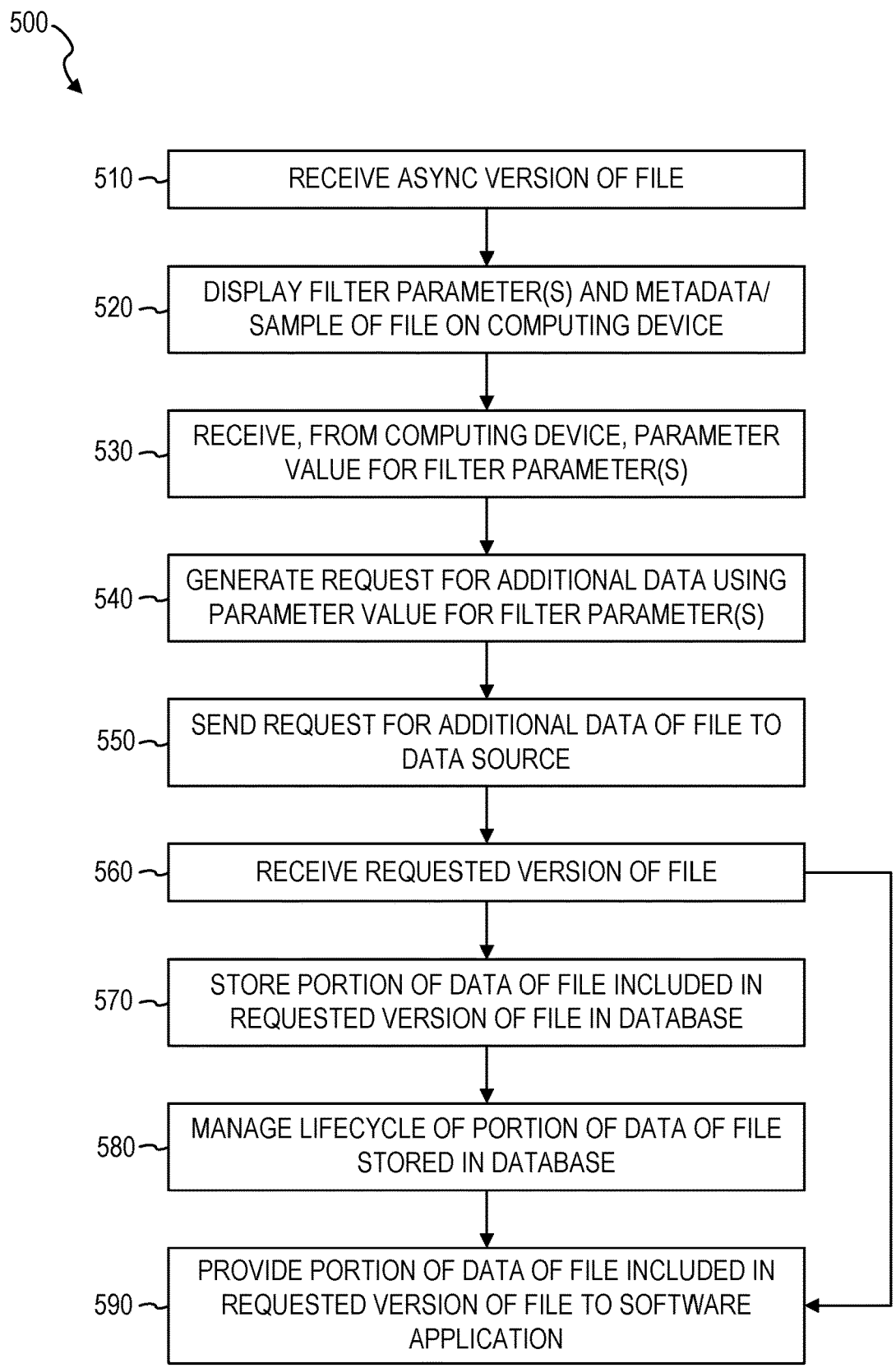
FIG. 5 is a flowchart illustrating another example method of dynamically loading a file.

FIG. 5 is a flowchart illustrating another example method 500 of dynamically loading a file. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the data consuming system 210 of FIG. 2 or any combination of one or more of its components (e.g., the client component 212, the daemon 214).

At operation 510, the data consuming system 210 may receive the async version 230 of the file. For example, the async version 230 of the file may be transmitted from the data source 220 to the data consuming system 210 via a network connection, such as the network 114 in FIG. 1. The async version 230 of the file that is received at operation 510 may be the same async version 230 of the file that is sent by the data source 220 at operation 410 in the method 400 of FIG. 1.

Next, the data consuming system 210 may display the one or more filter parameters and the at least one of the metadata of the file or the sample of the data of the file on a computing device, at operation 520. For example, the data consuming system 210 may transmit or otherwise communicate the one or more filter parameters and the at least one of the metadata of the file or the sample of the data of the file to the computing device along with instructions to display this information on the computing device.

The data consuming system 210 may then, at operation 530, receive the parameter value for the at least one of the one or more filter parameters from the computing device. For example, a user may submit the parameter value for the at least one of the one or more filter parameters via a user interface displayed on the computing device, such as via the user interface 300 in FIG. 3.

At operation 540, the data consuming system 210 may generate the request 240 for additional data of the file using the parameter value for the at least one of the one or more filter parameters. For example, the data consuming system 210 may create a message that comprises the parameter value for the at least one of the one or more filter parameters.

The message may also comprise an indication that the parameter value for the at least one of the one or more filter parameters is to be used in filtering data to be sent back to the data consuming system 210.

Next, the data consuming system 210 may send the request 240 for additional data of the file to the data source 220, at operation 550. For example, the data consuming system 210 may transmit the request 240 for additional data of the file to the data source 220 via a network connection, such as the network 114 in FIG. 1.

The data consuming system 210 may then, at operation 560 receive the requested version 250 of the file. The requested version 250 of the file may comprise data that corresponds to and satisfies the parameter value for the at least one of the one or more filter parameters. For example, the requested version 250 of the file may comprise data that has passed a filtering process that used the parameter value for the at least one of the one or more filter parameters as a basis for including the data in the requested version 250 of the file.

At operation 570, the data consuming system 210 may, in response to receiving the requested version 250 of the file, store the at least a portion of the data of the file included in the requested version 250 of the file in a database 218. The database 218 may be configured to store data for a software application 216 or for some other resource of the data consuming system 210.

Next, the data consuming system 210 may manage a lifecycle of the at least a portion of the data of the file stored in the database 218, at operation 580. For example, the data consuming system 210 may use a daemon 214 to delete data stored in the database after a specified period of time has passed, remove duplicate data stored in the database 218, and apply other lifecycle rules as well. The lifecycle rules may be defined by a user of the data consuming system 210, such as a user of the database 218 or a user of the software application 216.

The data consuming system 210 may then, at operation 590, provide the at least a portion of the data of the file included in the requested version 250 of the file to the software application 216. The software application 216 may comprise a cloud-based analytics application. However, other types of software applications 216 are also within the scope of the present disclosure. In some example embodiments, the data consuming system 210 may provide the at least a portion of the data of the file included in the requested version 250 of the file to the software application in response to the receiving of the requested version 250 of the file at operation 560, without storing the at least a portion of the data of the file in the database 218 at operation 570 or managing the lifecycle of the at least a portion of the data of the file at operation 580.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: sending an async version of a file to a client component, the file being stored in a data source and comprising data, the async version of the file comprising a uniform resource identifier for the file, a secret key for accessing the file, one or more filter parameters, and at least one of metadata of the file or a sample of the data of the file, at least a portion of the data of the file being excluded from the async version of the file; receiving a request for additional data of the file from the client component, the request for additional data from the file comprising a parameter value for at least one of the one or more filter parameters; generating a requested version of the file based on the request for additional data of the file, the generating of the requested version of the file comprising including at least a portion of the data of the file in the requested version of the file based on the parameter value for the at least one of the one or more filter parameters; and sending the requested version of the file to the client component.

Example 2 includes the computer-implemented method of example 1, wherein: the one or more filter parameters comprises one or more dimensions of the data of the file; and the including the at least a portion of the data of the file in the requested version of the file comprises filtering the data of the file based on the parameter value for at least one of the one or more dimensions of the data of the file.

Example 3 includes the computer-implemented method of example 1 or example 2, wherein the async version of the file comprises the sample of the data of the file.

Example 4 includes the computer-implemented method of any one of examples 1 to 3, wherein the async version of the file comprises the metadata of the file.

Example 5 includes the computer-implemented method of any one of examples 1 to 4, wherein the metadata of the file comprises at least one of a characterization of the data of the file, an identification of a creator of the file, a total size of the file, or a size of the at least a portion of the data of the file excluded from the async version of the file.

Example 6 includes the computer-implemented method of any one of examples 1 to 5, wherein the async version of the file further comprises an expiration date for accessing the file at the uniform resource identifier.

Example 7 includes the computer-implemented method of any one of examples 1 to 6, further comprising: receiving, by the client component, the async version of the file; displaying, by the client component, the one or more filter parameters and the at least one of the metadata of the file or the sample of the data of the file on a computing device; receiving, by the client component from the computing device, the parameter value for the at least one of the one or more filter parameters; generating, by the client component, the request for additional data of the file using the parameter value for the at least one of the one or more filter parameters; sending, by the client component, the request for additional data of the file to the data source; and receiving, by the client component, the requested version of the file.

Example 8 includes the computer-implemented method of any one of examples 1 to 7, further comprising: providing, by the client component, the at least a portion of the data of the file included in the requested version of the file to a software application.

Example 9 includes the computer-implemented method of any one of examples 1 to 8, wherein the software application comprises a cloud-based analytics application.

Example 10 includes the computer-implemented method of any one of examples 1 to 9, further comprising: in response to receiving the requested version of the file, storing the at least a portion of the data of the file included in the requested version of the file in a database; and managing, by a daemon, a lifecycle of the at least a portion of the data of the file stored in the database.

Example 11 includes a system comprising: at least one processor; and a non-transitory computer-readable medium storing executable instructions that, when executed, cause the at least one processor to perform the method of any one of examples 1 to 10.

Example 12 includes a non-transitory machine-readable storage medium, tangibly embodying a set of instructions that, when executed by at least one processor, causes the at least one processor to perform the method of any one of examples 1 to 10.

Example 13 includes a machine-readable medium carrying a set of instructions that, when executed by at least one processor, causes the at least one processor to carry out the method of any one of examples 1 to 10.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
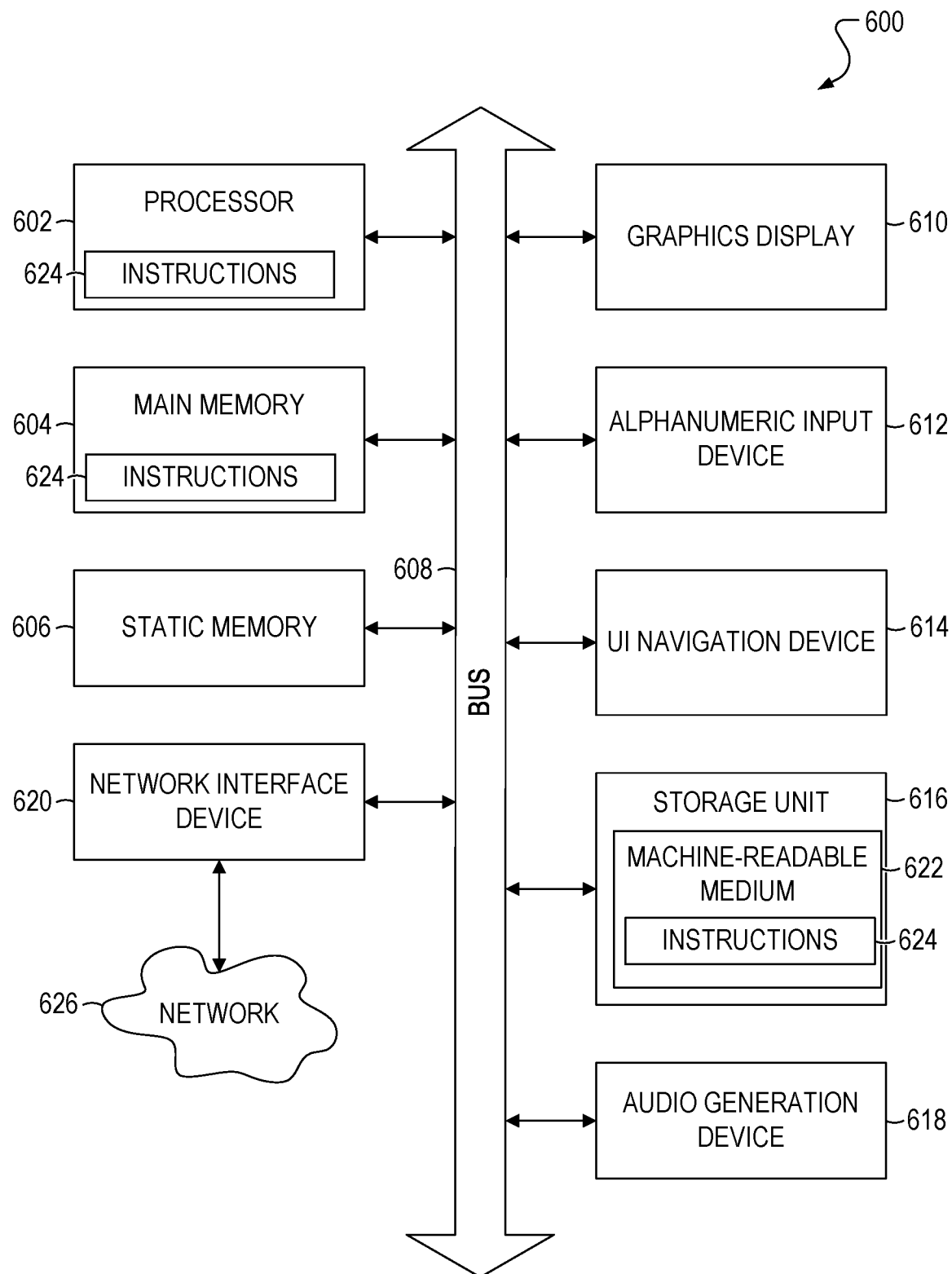
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
   sending an async version of a file to a client component, the file being stored in a data source and comprising data, the async version of the file comprising a uniform resource identifier for the file, a secret key for accessing the file, one or more filter parameters, and at least one of metadata of the file or a sample of the data of the file, at least a portion of the data of the file being excluded from the async version of the file;
   receiving a request for additional data of the file from the client component, the request for additional data from the file comprising a parameter value for at least one of the one or more filter parameters;
   generating a requested version of the file based on the request for additional data of the file, the generating of the requested version of the file comprising including at least a portion of the data of the file in the requested version of the file based on the parameter value for the at least one of the one or more filter parameters;
   storing the portion of the data of the file included in the requested version of the file in a database;
   managing, by a daemon, a lifecycle of the portion of the data of the file stored in the database; and
   sending the requested version of the file to the client component.

2. The computer-implemented method of claim 1, wherein:
   the one or more filter parameters comprises one or more dimensions of the data of the file; and
   the including the at least a portion of the data of the file in the requested version of the file comprises filtering the data of the file based on the parameter value for at least one of the one or more dimensions of the data of the file.

3. The computer-implemented method of claim 1, wherein the async version of the file comprises the sample of the data of the file.

4. The computer-implemented method of claim 1, wherein the async version of the file comprises the metadata of the file.

5. The computer-implemented method of claim 4, wherein the metadata of the file comprises at least one of a characterization of the data of the file, an identification of a creator of the file, a total size of the file, or a size of the at least a portion of the data of the file excluded from the async version of the file.

6. The computer-implemented method of claim 1, wherein the async version of the file further comprises an expiration date for accessing the file at the uniform resource identifier.

7. The computer-implemented method of claim 1, further comprising:
receiving, by the client component, the async version of the file;
displaying, by the client component, the one or more filter parameters and the at least one of the metadata of the file or the sample of the data of the file on a computing device;
receiving, by the client component from the computing device, the parameter value for the at least one of the one or more filter parameters;
generating, by the client component, the request for additional data of the file using the parameter value for the at least one of the one or more filter parameters;
sending, by the client component, the request for additional data of the file to the data source; and
receiving, by the client component, the requested version of the file.

8. The computer-implemented method of claim 1, further comprising:
providing, by the client component, the at least a portion of the data of the file included in the requested version of the file to a software application.

9. The computer-implemented method of claim 8, wherein the software application comprises a cloud-based analytics application.

10. A system comprising:
at least one hardware processor; and
a non-transitory computer-readable medium storing executable instructions that, when executed, cause the at least one hardware processor to perform computer operations comprising:
sending an async version of a file to a client component, the file being stored in a data source and comprising data, the async version of the file comprising a uniform resource identifier for the file, a secret key for accessing the file, one or more filter parameters, and at least one of metadata of the file or a sample of the data of the file, at least a portion of the data of the file being excluded from the async version of the file;
receiving a request for additional data of the file from the client component, the request for additional data from the file comprising a parameter value for at least one of the one or more filter parameters;
generating a requested version of the file based on the request for additional data of the file, the generating of the requested version of the file comprising including at least a portion of the data of the file in the requested version of the file based on the parameter value for the at least one of the one or more filter parameters;
storing the portion of the data of the file included in the requested version of the file in a database;
managing, by a daemon, a lifecycle of the portion of the data of the file stored in the database; and
sending the requested version of the file to the client component.

11. The system of claim 10, wherein:
the one or more filter parameters comprises one or more dimensions of the data of the file; and
the including the at least a portion of the data of the file in the requested version of the file comprises filtering the data of the file based on the parameter value for at least one of the one or more dimensions of the data of the file.

12. The system of claim 10, wherein the async version of the file comprises the sample of the data of the file.

13. The system of claim 10, wherein the async version of the file comprises the metadata of the file.

14. The system of claim 13, wherein the metadata of the file comprises at least one of a characterization of the data of the file, an identification of a creator of the file, a total size of the file, or a size of the at least a portion of the data of the file excluded from the async version of the file.

15. The system of claim 10, wherein the async version of the file further comprises an expiration date for accessing the file at the uniform resource identifier.

16. The system of claim 10, wherein the computer operations further comprise:
receiving, by the client component, the async version of the file;
displaying, by the client component, the one or more filter parameters and the at least one of the metadata of the file or the sample of the data of the file on a computing device;
receiving, by the client component from the computing device, the parameter value for the at least one of the one or more filter parameters;
generating, by the client component, the request for additional data of the file using the parameter value for the at least one of the one or more filter parameters;
sending, by the client component, the request for additional data of the file to the data source; and
receiving, by the client component, the requested version of the file.

17. The system of claim 10, wherein the computer operations further comprise:
providing, by the client component, the at least a portion of the data of the file included in the requested version of the file to a software application.

18. The system of claim 17, wherein the software application comprises a cloud-based analytics application.

19. A non-transitory machine-readable storage medium tangibly embodying a set of instructions that, when executed by at least one hardware processor, causes the at least one hardware processor to perform computer operations comprising:
sending an async version of a file to a client component, the file being stored in a data source and comprising data, the async version of the file comprising a uniform resource identifier for the file, a secret key for accessing the file, one or more filter parameters, and at least one of metadata of the file or a sample of the data of the file, at least a portion of the data of the file being excluded from the async version of the file;
receiving a request for additional data of the file from the client component, the request for additional data from the file comprising a parameter value for at least one of the one or more filter parameters;
generating a requested version of the file based on the request for additional data of the file, the generating of the requested version of the file comprising including at least a portion of the data of the file in the requested version of the file based on the parameter value for the at least one of the one or more filter parameters;
storing the portion of the data of the file included in the requested version of the file in a database;
managing, by a daemon, a lifecycle of the portion of the data of the file stored in the database; and sending the requested version of the file to the client component.

20. The non-transitory machine-readable storage medium of claim 19, wherein the computer operations further comprise:
  receiving, by the client component, the async version of the file;
  displaying, by the client component, the one or more filter parameters and the at least one of the metadata of the file or the sample of the data of the file on a computing device;
  receiving, by the client component from the computing device, the parameter value for the at least one of the one or more filter parameters;
  generating, by the client component, the request for additional data of the file using the parameter value for the at least one of the one or more filter parameters;
  sending, by the client component, the request for additional data of the file to the data source; and
  receiving, by the client component, the requested version of the file.

\* \* \* \* \*